3,180,889
PREPARATION OF NITROTETRACYCLINES

Joseph John Hlavka, New City, N.Y., and Helen Marie Krazinski, Ramsey, N.J., assignors to American Cyanamid Company, Stamford, Conn., a corporation of Maine
No Drawing. Filed Apr. 20, 1962, Ser. No. 188,969
3 Claims. (Cl. 260—559)

This invention relates to the preparation of nitrotetracyclines and more particularly is concerned with an improved method of preparing these valuable tetracycline derivatives.

The nitrotetracyclines, 7-nitro-6-demethyl-6-deoxytetracycline, 9 - nitro - 6 - demethyl - 6 - deoxytetracycline, 7-nitro - 6 - deoxytetracycline, 9 - nitro - 6 - deoxytetracycline, 7 - nitro - 5 - hydroxy - 6 - deoxytetracycline and 9-nitro-5-hydroxy-6-deoxytetracycline, are new compounds of the tetracycline family of antibiotics possessing broad-spectrum antibacterial activity. The nitrotetracyclines and a method of preparation are described by James H. Boothe et al. in the Journal of the American Chemical Society, 82, 1253 (1960).

Conventionally, the nitrotetracyclines are prepared by the reaction of an appropriate deoxytetracycline, such as 6-demethyl-6-deoxytetracycline, with potassium nitrate and a strong mineral acid such as sulfuric acid at temperatures ranging from about −15° C. to about +15° C. This nitration reaction with potassium nitrate results in a 50–50 mixture of isomeric products, in this instance roughly an equal mixture of 9-nitro-6-demethyl-6-deoxytetracycline and 7-nitro-6-demethyl-6-deoxytetracycline. The nitrotetracyclines can be readily transformed to the corresponding aminotetracyclines as by catalytic reduction of the nitro group to form especially valuable products having enhanced antimicrobial properties. The catalytic reduction, of course, also results in about equal amounts of 9-amino-6-demethyl-6-deoxytetracycline and 7-amino-6-demethyl-6-deoxytetracycline.

It has been found, however, that the isomer 9-amino-6-demethyl-6-deoxytetracycline is considerably more active in vivo than the 7-amino isomer and possesses still further important properties such as stability in the body fluids. Also 9-amino-6-demethyl-6-deoxytetracycline is from two to eight times more potent than tetracycline on a dosage level against the bacterial infections Pneumococcus SV1, Pasteurella 310, E. coli 311 and Staphylococcus Smith in mice by the single oral tubing route. Additionally, the 9-amino compound is less toxic in mice than tetracycline. All of these advantages make this compound exceedingly attractive for clinical use. Therefore, any method which results in increasing the ratio of the desirable 9-isomer would be of considerable economic importance.

In accordance with the present invention we have now discovered an improved method of nitration of the deoxytetracyclines utilizing nitrogen tetroxide which unexpectedly results in a much higher ratio, of the order of 6:1, of the desired 9-nitro isomer over the 7-nitro isomer. No reason is apparent why nitrogen tetroxide results in the selective formation of the 9-nitro isomer, and the present invention is not limited to any particular theory of action.

In carrying out the present invention a solution of nitrogen tetroxide in a strong acid such as sulfuric acid, phosphoric acid, trifluoroacetic acid, etc., is added to a solution of an appropriate deoxytetracycline. Ordinarily, the same solvent is used for each of the two solutions. Generally a molar excess, 50% or more, of nitrogen tetroxide is used. Preferably, the reaction is carried out at reduced temperatures of the order of −5° C. to +10° C. The reaction time is usually short, frequently running not more than about ten minutes. When the reaction is complete, the reaction product is separated by filtration and may be precipitated with cold ether. The desired 9-nitro isomer may then be purified by recrystallization in a standard manner.

The present invention is not limited to the nitration of 6-demethyl-6-deoxytetracycline but may be applied with equal facility to the nitration of 6-deoxytetracycline and 5-hydroxy-6-deoxytetracyline as well, although as indicated above, the principal usefulness of this reaction is in the preparation of the more important 9-amino-6-demethyl-6-deoxytetracycline.

The invention will be described in greater detail in conjunction with the following specific examples:

EXAMPLE 1

*Preparation of 9-nitro-6-demethyl-6-deoxytetracycline sulfate*

To a solution of 100 mg. (0.22 mmole) of 6-demethyl-6-deoxytetracycline hydrochloride in 10 ml. of concentrated sulfuric acid at ice-bath temperature is added enough nitrogen tetroxide to decolorize the solution from a dark red to light yellow color. The mixture is immediately poured into 200 ml. of cold ether. The solid that separates weighs 80 mg.

Reduction of this material with hydrogen and $PtO_2$ catalyst and subsequent analysis of the reduced material by quantitative paper strip chromatography shows an isomer ratio of 4 parts 9-amino-6-demethyl-6-deoxytetracycline to 1 part of 7-amino-6-demethyl-6-deoxytetracycline.

EXAMPLE 2

*Preparation of 9-nitro-6-demethyl-6-deoxytetracycline sulfate*

To a solution of 6-demethyl-6-deoxytetracycline hydrochloride (1.00 g., 0.0022 m) in concentrated sulfuric acid (10 ml.) at 0° C., there is added with stirring a sulfuric acid solution of nitrogen tetroxide [0.306 g., 0.003 m. (2.2 ml. of a 14% solution at 0° C.)]. The dark brown solution is stirred at 0° C. for 3 minutes and the solid which precipitates out of an ether solution (700 ml.) is collected by filtration, washed well with ether and dried in a vacuum desiccator; yield 0.900 g.

$$\lambda_{max.}^{0.1\ N\ NaOH}\ 425,\ 365,\ 285\ m\mu\ R_f\ 0.47$$

Reduction of this material with hydrogen and platinum oxide catalyst and subsequent analysis of the reduced material by quantitative paper strip chromatography shows an isomer ratio of 6 parts 9-amino-6-demethyl-6-deoxytetracycline to 1 part 7-amino-6-demethyl-6-deoxytetracycline.

The above procedure is repeated using 6-deoxytetracycline and 5-hydroxy-6-deoxytetracycline, respectively, as the starting materials. An improved yield of the desired 9-nitro isomer is obtained.

We claim:

1. The method of nitrating 6-demethyl-6-deoxytetracycline so as to preferentially form the 9-nitro-6-demethyl- 6-deoxytetracycline isomer which comprises reacting 6-demethyl-6-deoxytetracycline with nitrogen tetroxide in a strong acid solvent at reduced temperatures.

2. The method according to claim 1 in which the solvent solution is sulfuric acid.

3. The method according to claim 1 in which the temperature of the reaction is between about $-5°$ C. and $+10°$ C.

References Cited by the Examiner

Boothe et al.: J. Am. Chem. Soc., volume 82, pages 1253–1264 (1960).

Pinck: J. Am. Chem. Soc., volume 49, pages 2536–2539 (1927).

IRVING MARCUS, *Primary Examiner.*

WALTER A. MODANCE, *Examiner.*